(12) United States Patent
Ghajar

(10) Patent No.: US 7,849,525 B2
(45) Date of Patent: Dec. 14, 2010

(54) APPARATUS FOR REDUCING BRAIN AND CERVICAL SPINE INJURY DUE TO ROTATIONAL MOVEMENT

(76) Inventor: Jamshid Ghajar, 30 West St., Suite 25F, New York, NY (US) 10004

( * ) Notice: Subject to any disclaimer, the term of this patent is extended or adjusted under 35 U.S.C. 154(b) by 0 days.

(21) Appl. No.: 12/296,820

(22) PCT Filed: Apr. 12, 2007

(86) PCT No.: PCT/US2007/009028
§ 371 (c)(1),
(2), (4) Date: Oct. 10, 2008

(87) PCT Pub. No.: WO2007/120764
PCT Pub. Date: Oct. 25, 2007

(65) Prior Publication Data
US 2009/0158509 A1 Jun. 25, 2009

Related U.S. Application Data

(60) Provisional application No. 60/791,603, filed on Apr. 12, 2006.

(51) Int. Cl.
*A42B 3/00* (2006.01)
(52) U.S. Cl. .............................. 2/416; 2/410
(58) Field of Classification Search .................. 2/425, 2/468, 421, 416, 411, 6.1, 6.2, 422; 244/122 AG, 244/122 R, 122 B; 280/290, 801.1, 748; 297/464, 465, 216.12, 485, 216.13, 393
See application file for complete search history.

(56) References Cited

U.S. PATENT DOCUMENTS

| | | | |
|---|---|---|---|
| 1,136,307 A | 4/1915 | Bourdon | 2/456 |
| 1,301,276 A | 4/1919 | Kroetz | 602/19 |
| 1,409,326 A | 3/1922 | Williamson | 2/44 |
| 3,041,623 A | 7/1962 | Glahe et al. | 2/9 |
| 3,134,106 A | 5/1964 | Shaffer et al. | 2/462 |
| 3,148,375 A | 9/1964 | Jones | 2/421 |
| 3,242,500 A | 3/1966 | Derr | 2/412 |
| 3,258,010 A | 6/1966 | Austin et al. | 128/201.25 |
| 3,471,145 A | 10/1969 | Berger | 272/79 |
| 3,497,872 A | 3/1970 | Mitchell | 2/468 |
| 3,671,974 A | 6/1972 | Sims | 2/421 |

(Continued)

FOREIGN PATENT DOCUMENTS

WO WO 2007/120764 10/2007

OTHER PUBLICATIONS

PCT International Search Report based on PCT/US07/09028 dated Nov. 14, 2007.

(Continued)

*Primary Examiner*—Shaun R Hurley
*Assistant Examiner*—Andrew W Sutton
(74) *Attorney, Agent, or Firm*—Morgan, Lewis & Bockius LLP

(57) ABSTRACT

The present invention may comprise a helmet worn by a person, with additional elements to dampen, restrain or totally block rotational movement upon the sensing of severe rotational movement of the head. This device prevents serious brain and cervical spine injury by restraining or totally blocking rotational movement of the head in response to severe acceleration/deceleration.

26 Claims, 13 Drawing Sheets

U.S. PATENT DOCUMENTS

| | | | |
|---|---|---|---|
| 3,818,509 A | 6/1974 | Romo et al. ............... 2/421 |
| 3,873,996 A | 4/1975 | Varteressian .............. 2/421 |
| 3,879,761 A | 4/1975 | Bothwell .................. 2/415 |
| 3,889,668 A | 6/1975 | Ochs et al. ............. 128/134 |
| 3,900,896 A | 8/1975 | Ackerman .................. 2/468 |
| 4,020,507 A | 5/1977 | Morton .................... 2/411 |
| 4,219,193 A | 8/1980 | Newman .................. 272/94 |
| 4,338,685 A | 7/1982 | LaPorta ..................... 2/2 |
| 4,489,919 A | 12/1984 | Ostrobrod ............... 254/346 |
| 4,501,023 A | 2/1985 | Bilberry .................... 2/2 |
| 4,638,510 A | 1/1987 | Hubbard .................... 2/6 |
| 4,664,341 A | 5/1987 | Cummings ................ 244/122 |
| 4,697,289 A * | 10/1987 | Luigi ..................... 2/422 |
| 4,825,476 A | 5/1989 | Andrews ................... 2/421 |
| 4,846,313 A | 7/1989 | Sharp .................... 188/187 |
| 4,909,459 A * | 3/1990 | Patterson ............ 244/122 AG |
| 5,027,833 A | 7/1991 | Calkin ................... 128/870 |
| 5,123,408 A | 6/1992 | Gaines .................... 602/17 |
| 5,219,206 A * | 6/1993 | Anthony et al. ........... 297/473 |
| 5,242,377 A | 9/1993 | Boughner et al. ........... 602/17 |
| 5,248,293 A | 9/1993 | Hubbard et al. ............ 602/17 |
| 5,261,125 A | 11/1993 | Cartwright et al. .......... 2/421 |
| 5,287,562 A | 2/1994 | Rush, III .................. 2/413 |
| 5,313,670 A | 5/1994 | Archer, III ................ 2/411 |
| 5,314,404 A | 5/1994 | Boughner et al. ........... 602/17 |
| 5,338,062 A | 8/1994 | Kiuchi et al. ............. 280/735 |
| 5,371,905 A | 12/1994 | Keim ...................... 2/413 |
| 5,437,613 A | 8/1995 | Reggio et al. ............. 602/18 |
| 5,517,699 A | 5/1996 | Abraham, II .............. 2/425 |
| 5,546,601 A | 8/1996 | Abeyta ..................... 2/2 |
| 5,715,541 A | 2/1998 | Landau .................... 2/425 |
| 5,930,843 A | 8/1999 | Kelly ..................... 2/468 |
| 6,006,368 A | 12/1999 | Phillips .................. 2/468 |
| 6,009,566 A | 1/2000 | Hubbard .................. 2/468 |
| 6,052,835 A | 4/2000 | O'Shea ................... 2/468 |
| RE36,691 E | 5/2000 | Pinsen ................... 2/468 |
| 6,330,722 B1 | 12/2001 | Betts .................... 2/416 |
| 6,385,781 B1 | 5/2002 | Rose et al. .............. 2/425 |
| 6,418,564 B1 | 7/2002 | Sheridan ................. 2/425 |
| 6,481,026 B1 | 11/2002 | McIntosh ................. 2/468 |
| 6,751,809 B1 | 6/2004 | Cooper et al. ............ 2/421 |
| 6,874,170 B1 | 4/2005 | Aaron .................... 2/468 |
| 6,931,669 B2 | 8/2005 | Ashline .................. 2/422 |
| 6,968,576 B2 | 11/2005 | McNeil et al. ............ 2/425 |
| 6,971,123 B2 | 12/2005 | Weaver ................... 2/468 |
| 6,978,523 B2 | 12/2005 | Downing et al. ........... 24/628 |
| 7,120,982 B2 | 10/2006 | Downing et al. ......... 29/401.1 |
| 7,155,747 B2 | 1/2007 | Baker .................... 2/422 |
| 7,165,785 B2 | 1/2007 | Bouladian ............... 280/735 |
| 7,231,698 B2 | 6/2007 | Downing et al. ........... 24/628 |
| 7,234,210 B2 | 6/2007 | Stiles et al. ............ 24/628 |
| 7,387,598 B2 | 6/2008 | Miller .................. 482/112 |
| 7,426,773 B2 | 9/2008 | Downing et al. ........... 24/628 |
| 2003/0088906 A1 | 5/2003 | Baker |
| 2007/0186329 A1 | 8/2007 | Baker .................... 2/410 |
| 2007/0245464 A1 | 10/2007 | Baker .................... 2/411 |
| 2009/0064396 A1 | 3/2009 | Ghajar ................... 2/411 |

OTHER PUBLICATIONS

HANS device—Wikipedia article—http://en.wikipedia.org/wiki/HANS_device.

* cited by examiner

APPARATUS FOR REDUCING BRAIN AND CERVICAL SPINE INJURY DUE TO ROTATIONAL MOVEMENT

RELATED APPLICATIONS

This application is a national phase filing under 35 U.S.C. 371 of International Application No. PCT/US2007/009028, filed on Apr. 12, 2007, and claims the benefit of U.S. Provisional Application No. 60/791,603, filed Apr. 12, 2006, the entirety of these applications are hereby incorporated herein by reference for the teachings therein.

FIELD OF THE INVENTION

The present invention relates to head and neck rotation acceleration/deceleration restraint and dampening systems that reduce or eliminate damage to or shearing of brain matter, axons and cervical spinal cord and spine. In particular, this invention provides a dampening device to prevent the brain from substantial rotational acceleration or deceleration that would lead to tearing of brain or cervical spine tissue.

BACKGROUND OF THE INVENTION

The brain generally consists of an outer layer of grey matter or cortex where neurons are located and white matter or axons, which connect the gray matter areas. Disruption of white matter connections disables brain function. Symptoms can be as mild as memory and attention difficulties, and as serious as a coma state.

Diffuse axonal injury (DAI) results from rotational shear forces that tear white matter tracts. DAI is common in traumatic brain injury (TBI) and accounts for persistent cognitive deficits and symptoms.

Acceleration/deceleration TBI studies in animals and clinical investigations have attributed cognitive deficits to DAI. Distinguished from focal contusion without shearing, DAI is defined as damage to axons at the gray/white matter junction of the cerebral hemispheres, corpus callosum and dorsolateral midbrain and often involves the superior cerebellar peduncles. These deep white matter abnormalities can be detected by a MRI and are associated with poorer neuropyschological test performances and poor long-term outcome.

Rapid acceleration and deceleration of a person's head, especially with a rotational component causes serious damage to the white matter connections in the brain. This is the most common form of brain injury and occurs in car crashes, falls, sporting accidents and recently in war as a consequence of road-side bombs that cause a blast wave to whip the head producing rotational shear injury.

In addition, rapid acceleration/deceleration in flexion, extension or rotation movements can cause fractures, torn ligaments, disc herniations, cervical spine and spinal cord injury and other damage of the neck cervical spine.

This patent application describes embodiments to dampen or minimize the rotational component of rapid acceleration/deceleration that can cause damage to the brain or cervical spine while allowing free movement at lower accelerations. The acceleration/deceleration is calculated for the head and cervical spine with respect to the torso.

An object of the invention is to reduce the incidence of brain, cervical spine, and spinal cord injury in crash victims, athletes and others while providing unencumbered head motion and range during normal circumstances.

Another object is to provide such a device, which can be conveniently worn during normal circumstances and is a device which is simple to use and is automatically displayed.

Still another object of this invention is to provide a device capable of widespread use and exploitation.

Other objects, advantages and features of this invention will become more apparent hereinafter.

SUMMARY OF THE INVENTION

The invention provides advantages over the prior art by providing automatic dampening of the motion of a user's head when dangerously large accelerations are present, but creating no or very little inconvenience to the user in normal circumstances. In some cases rotational movement may be completely prevented or always allowed, depending on the threshold settings for the restraint system.

DETAILED DESCRIPTION OF THE PREFERRED EMBODIMENT

Figure 1:
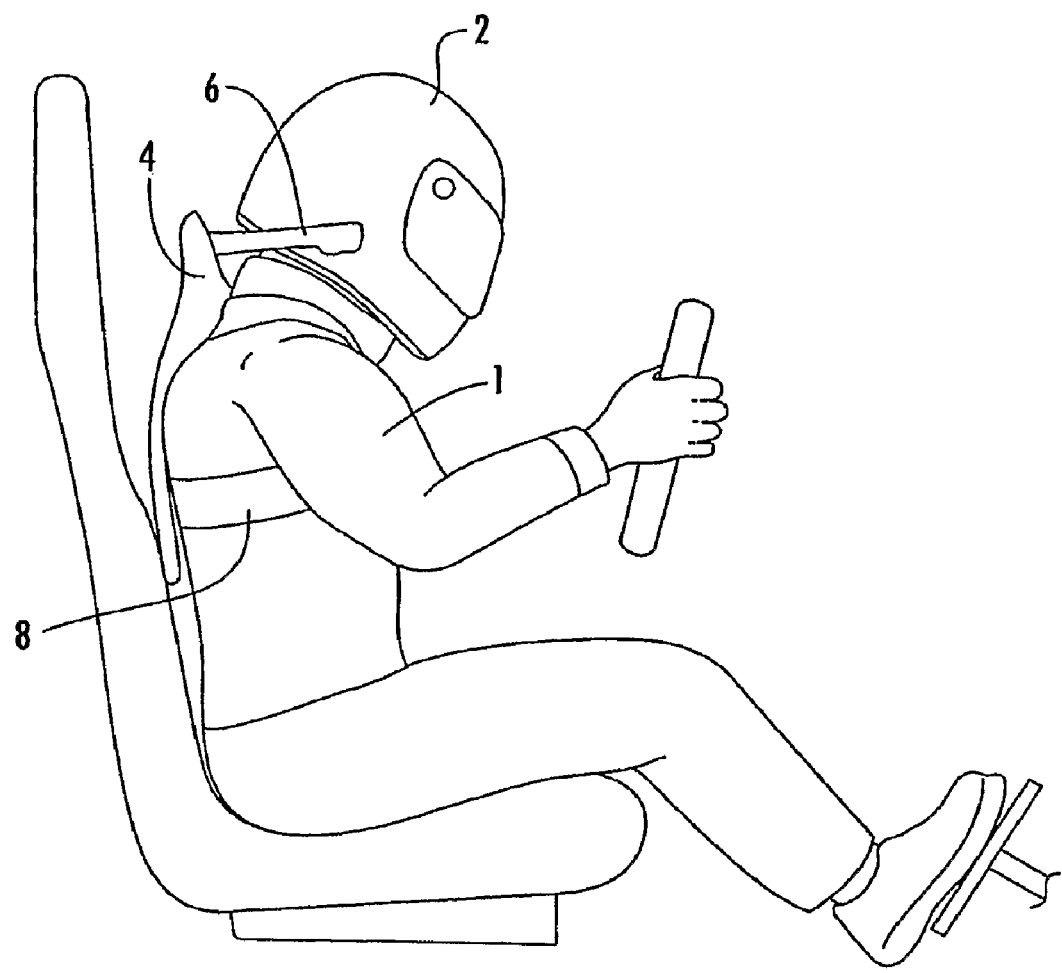
FIG. 1 is a side view of a prior art apparatus for restraining head movement during a traumatic event.

FIG. 1 shows a prior art device (as disclosed in U.S. Pat. No. 6,931,669 to Trevor P. Ashline) to control head movement during rapid acceleration/deceleration which straps a user's helmet 2 to a support plate 4 worn by the user with head strap 6. Strap 8 further secures the support plate 4 to the user. A fixed strap system is an improvement and life safer over just wearing a helmet by itself. However this system is not suitable for protecting a person's brain in the event of rapid rotational accelerations of the head, both in vehicular and non-vehicular situations, because there is no way to detect such movement in the device of FIG. 1. Furthermore, no free movement of the head is allowed.

Figure 2:
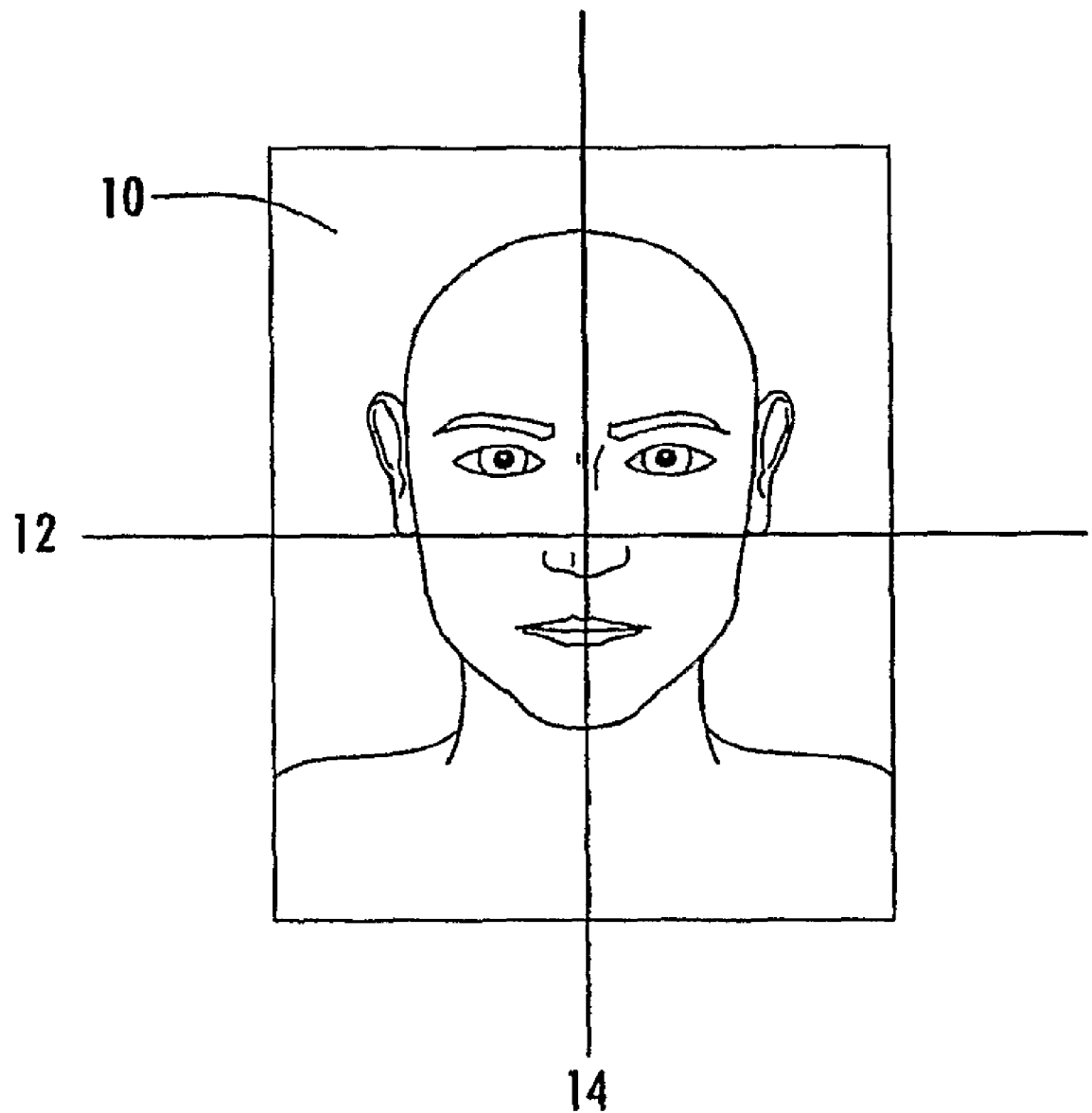
FIG. 2 is a front view of the three rotational planes through the head.

FIG. 2 shows the three planes in which the head can rotate. The coronal plane 10 lies roughly parallel to the chest. Moving one's head side to side, or moving the ear toward the shoulder, is an example of head rotation in the coronal plane. The axial plane 12 perpendicular to coronal plane 10 lies roughly parallel to the top of the head, like the rim of a hat. Shaking one's head to indicate "no, is an example of head rotation in the axial plane. The sagittal plane 14 is perpendicular to both planes 10 and 12, and bisects the left side of the head from the right. Nodding one's head to indicate, "Yes," is an example of head rotation in the sagittal plane.

Figure 3A:
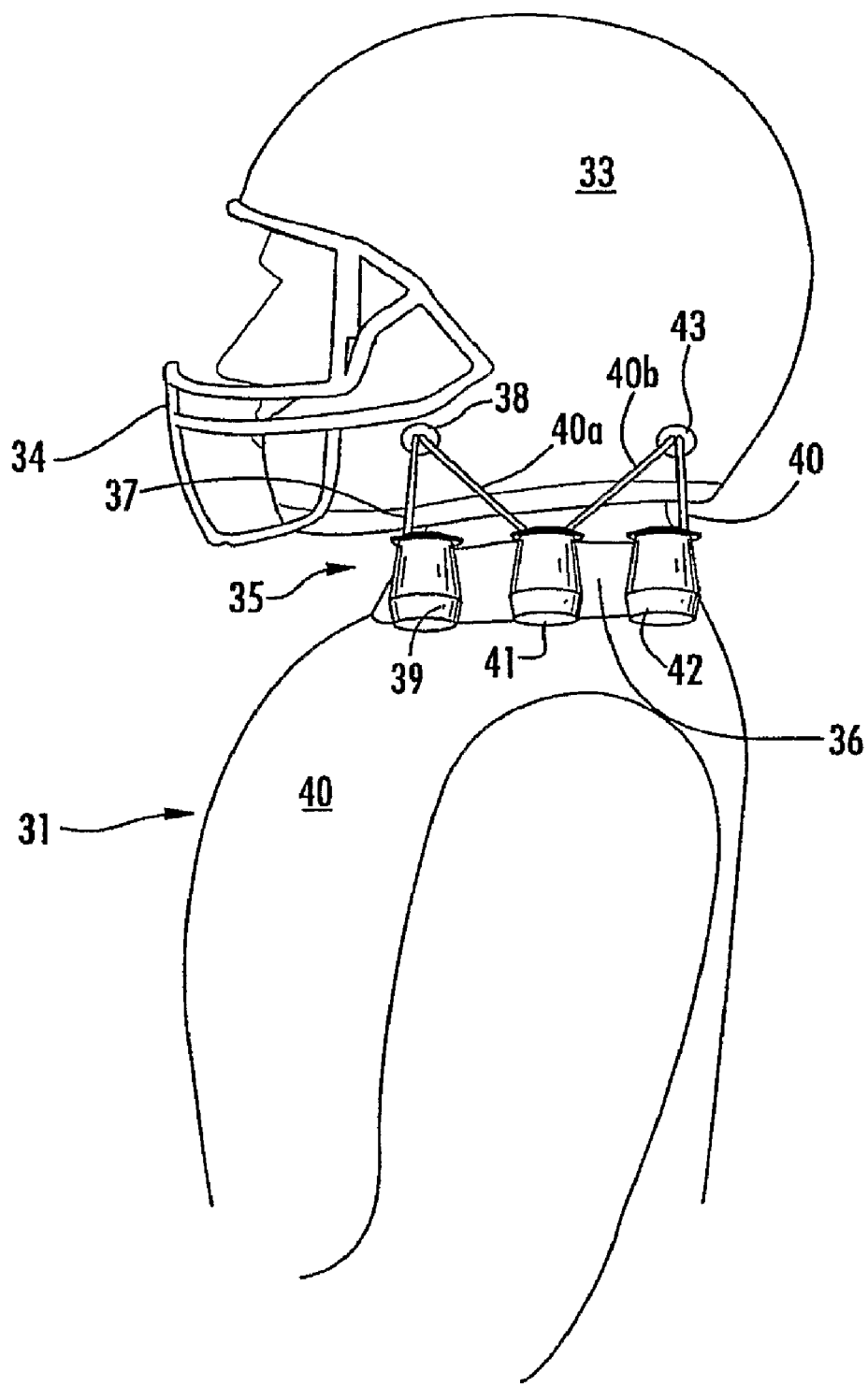
FIGS. 3a and 3b are side and rear views of the preferred embodiments of this invention.
Figure 3B:
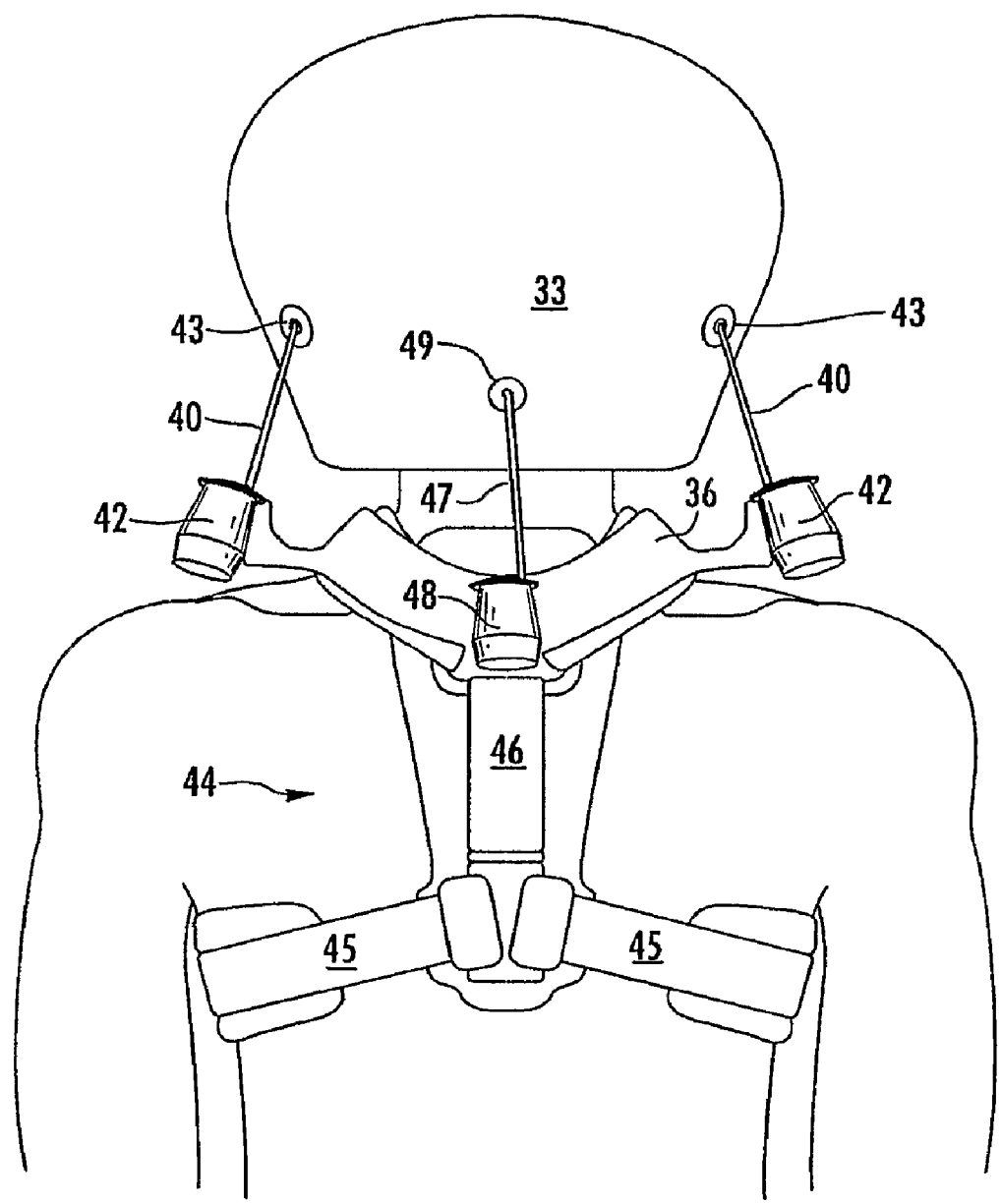

FIGS. 3a and 3b show preferred embodiments of this invention in which a person 31 wears a helmet 33 having the appearance of a conventional football helmet with a face guard 34. This invention prevents rotation of the head in all three planes with respect to the torso. In a preferred embodiment, it is important to find a fixed reference, which hardly moves with respect to the torso. Such a fixed reference is the neck 35 and a neck or collar reference, plate 36, similar to a standard collar, which is worn by the user at the base of the neck. FIG. 3a shows a left side view of the invention, and the right side view would be substantially similar. A side front tether 37 is attached between a side front point 38 on the helmet and a front collar spool 39 and this tether detects extension in the sagittal plane. A side rear tether 40 is attached a side rear point 43 on the helmet and a rear collar spool 42 and this detects flexion in the sagittal plane. Tether 40a is connected between front helmet attachment 38 and middle spool 41. This tether detects axial rotation or the face rotating away from spool 39. Tether 40b is connected between the rear side attachment 43 and middle spool 41 and detects axial rotation or the face rotating toward spool 39. Tethers 40a and 40b together detect coronal movement with the whole head angling away from spool 41.

FIG. 3b shows the preferred embodiment of the collar plate 36 of FIG. 3a as a fixed reference to the torso in which a body harness 44 comprised of a chest strap 45 and a vertical connecting strap 46 attach to a collar plate 36. A rear tether 47 is connected between a rear collar spool 48 and a rear attachment point 49 on the helmet and this detects flexion in the sagittal plane in addition to tethers 40. Rear side tethers 40 are shown attached between back collar spool 42 and side rear point 43 on the helmet. Harness 44 substantially fixes collar plate 36 with respect to the torso.

The preferred embodiment of this invention in FIGS. 3a/3b uses a series of small tethers or belts attached between the helmet 33 and the collar reference plate 36 that do not significantly interfere with normal motion, but effectively dampen and slow accelerations of the head so as to greatly lessen the likelihood of injury. These tethers can be on a spool or pulley that allows the tether to be extended as the user moves his head, but can lock or slow the tether if there are significant accelerations detected. These tethers may be designed to further extend and dampen the motion of the head when the spools have been locked by an activation module. The spools and/or reference plate may provide some or all of the needed damping. Alternatively, the material used in the tether can have inherent properties to allow stretching at slow but not high accelerations.

Figure 4A:
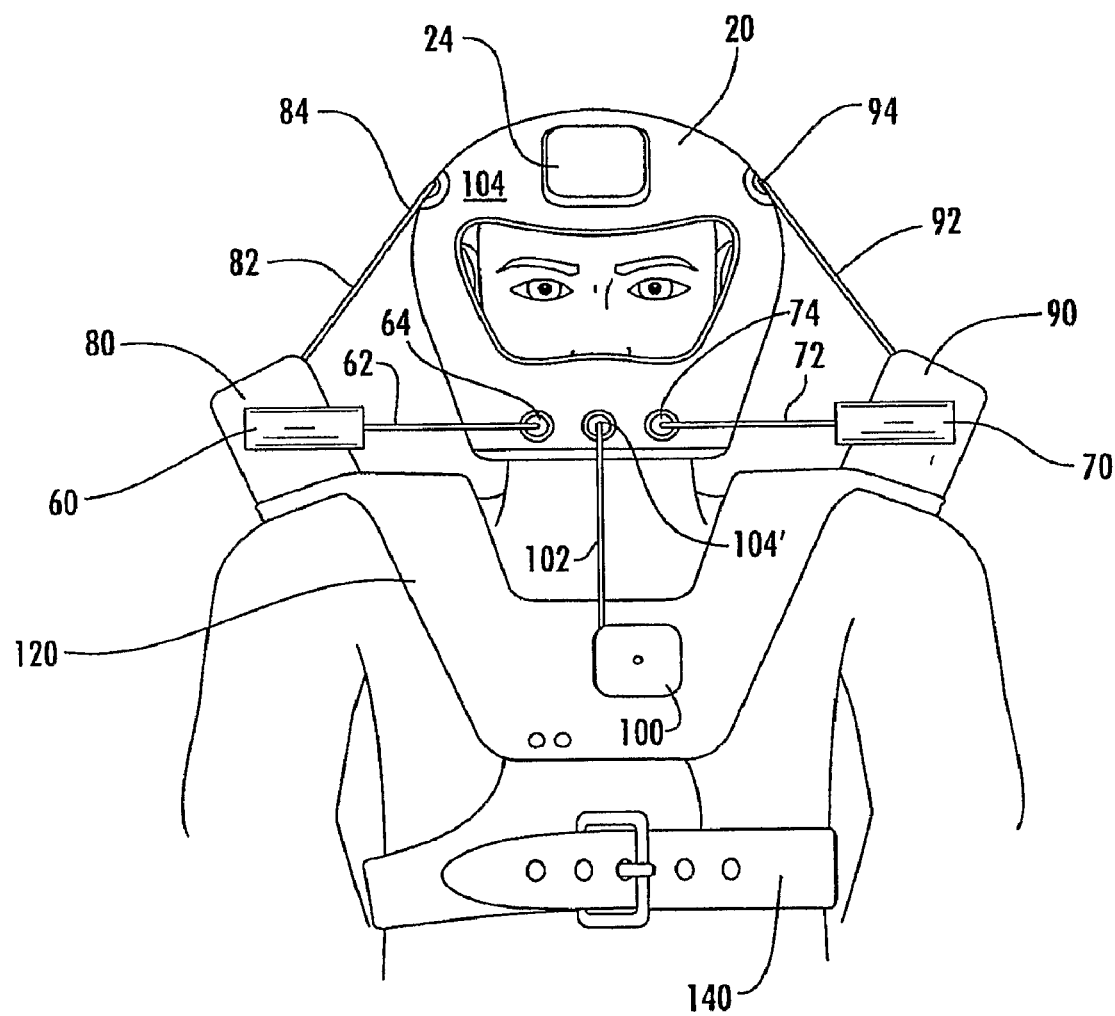
FIGS. 4a and 4b are perspective views of another embodiment of the present invention using an airbag collar, both before and after deployment.
Figure 4B:
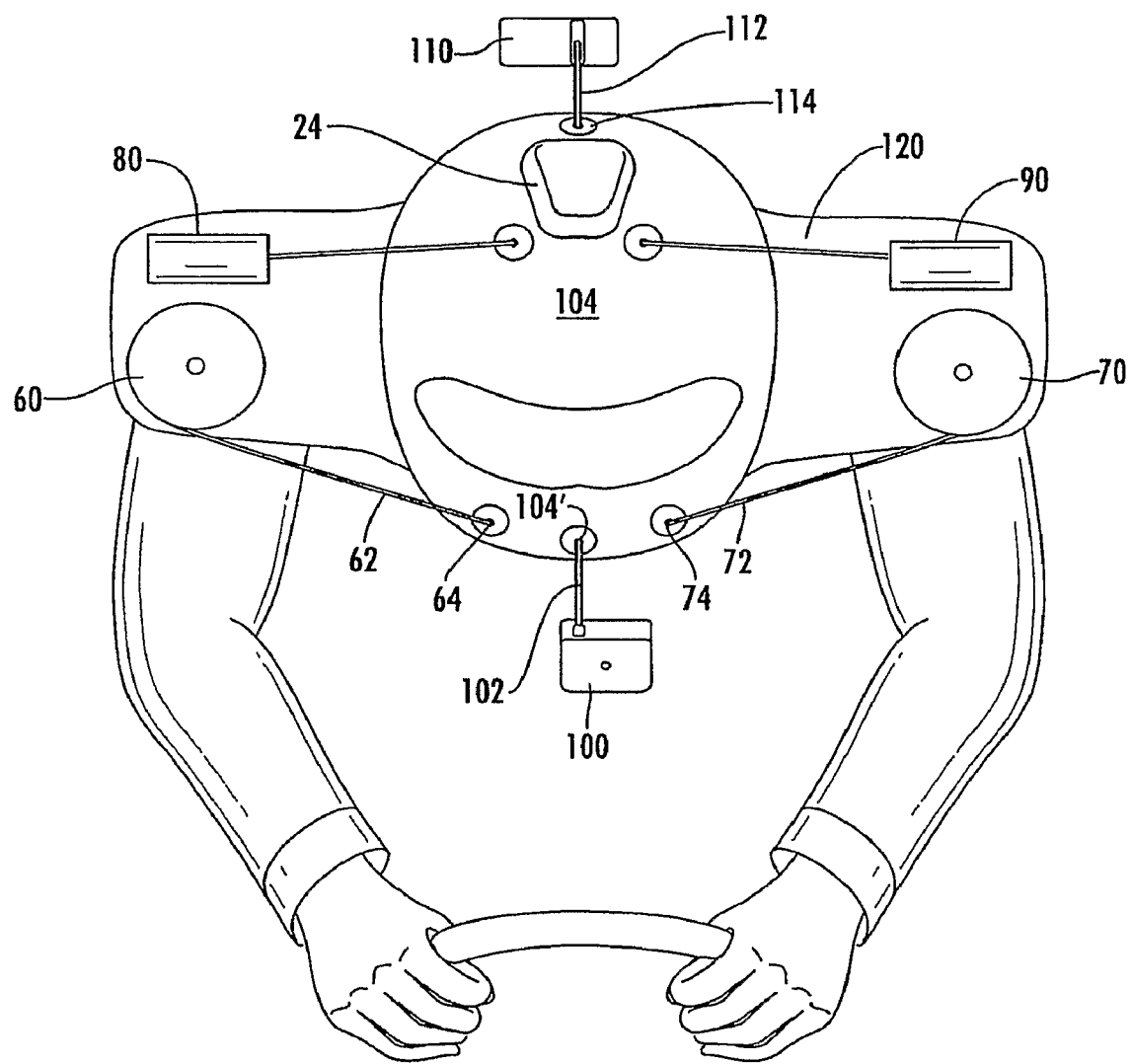

FIGS. 4a and 4b show another embodiment of this invention with a different type helmet attached to a shoulder reference plate. While a shoulder reference plate may experience more motion with respect to the torso, it is a valuable alternative because of the size of the shoulder reference plate. Shoulder reference plate 120 is similar to shoulder pads and covers some portion of the user's back, continues over the shoulders and covers some portion of the chest with belt 140 to allow the user to adjust the fit. Reference plate 120 is generally maintained in place and is the reference or anchor against which rotational movement is prevented. Spools 60, 70, 80, 90, 100, and 110 are mounted on this reference plate. These spools are similar to those in FIGS. 3a and 3b and are mechanically or electro-mechanically controlled, and in the event of an impact or dangerously large acceleration they will act to slow, dampen and stop the movement of the head relative to the reference plate 120. The spool mechanism may also incorporate a pretensioning system to eliminate slack in the tethers and potentially best position the user's head for surviving the impending impact and acceleration.

Spools 60 and 70, located on top of the right and left shoulders respectively, control head rotation in the axial plane 12 using tethers 62 and 72 with attachments to the helmet 104 at points 64 and 74 located to the right and left of the chin. Relocating these components may offer advantages in specific applications. Spools 80 and 90, also located on top of the shoulders, control head rotation in the coronal plane using tethers 82 and 92 with attachments to the helmet 84 and 94 being near the top or crown of the helmet. Spools 100 and 110, located near the user's sternum and spine respectively, control head rotation in the sagittal plane using tethers 102 and 112 with attachments 104' to the helmet near the chin and 114 on the back of the helmet.

Figure 5:
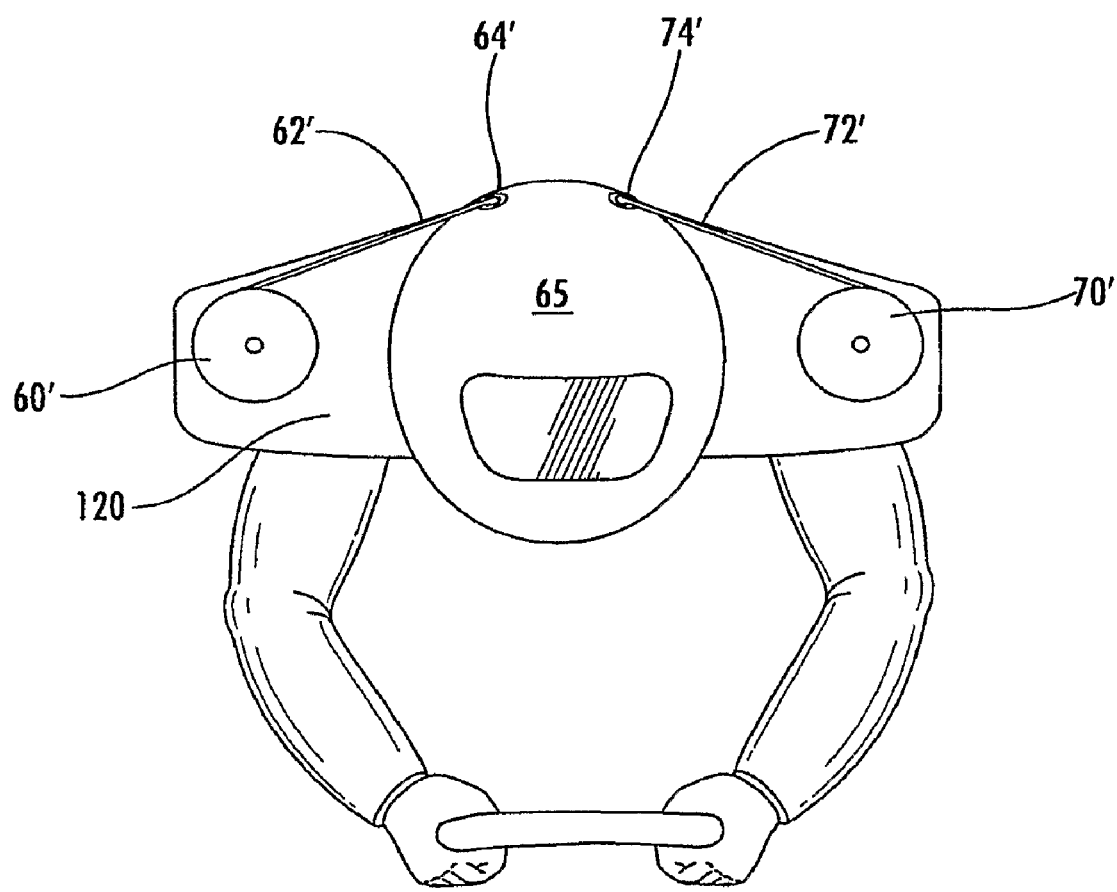
FIG. 5 is a top view of an alternative embodiment of the present invention.

FIG. 5 shows another embodiment of the invention of FIGS. 4a and 4b in which the tethers' attachment points to the helmet can have alternative locations and still be effective. Specifically it shows tethers 62' and 72' between spools 60' and 70' respectively and attachment points, 64' and 74', respectively. These are attached to the back of the helmet 65 instead of near the chin at the front and detects axial movement.

Figure 6A:
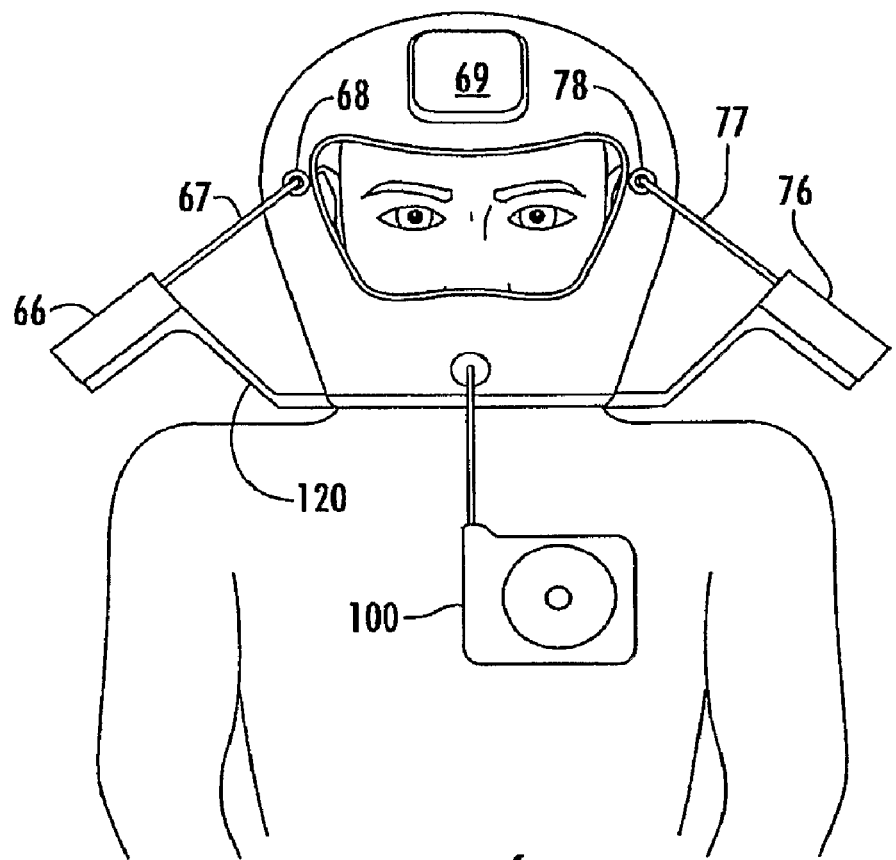
FIGS. 6a and 6b are front and top views of a vehicle occupant wearing an embodiment of the present invention head retraining system utilizing tethers and recoiling spools.
Figure 6B:
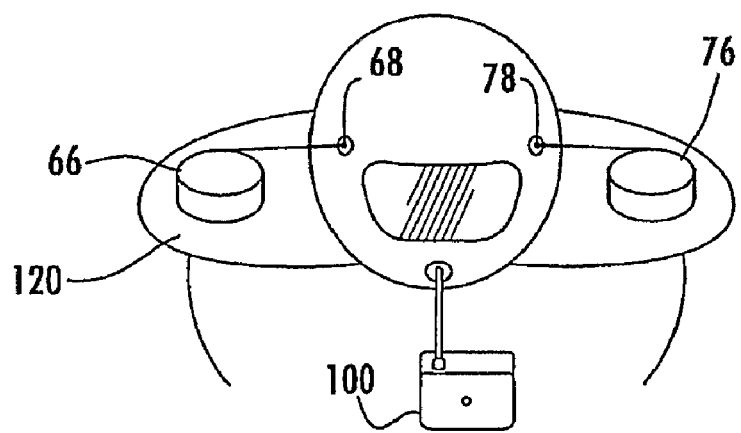

FIGS. 6a and 6b show yet another embodiment that combines the function of spools 60, 70, 80 and 90 of FIG. 4 into just two spools 66 and 76 with tethers 67 and 77 attached to the helmet 69 at connections 68 and 78.

There are other ways to protect the head from rapid rotational accelerations, while causing little inconvenience to the wearer.

Figure 7A:
FIGS. 7a and 7b are side perspective views of another alternative embodiment of this invention.
Figure 7B:
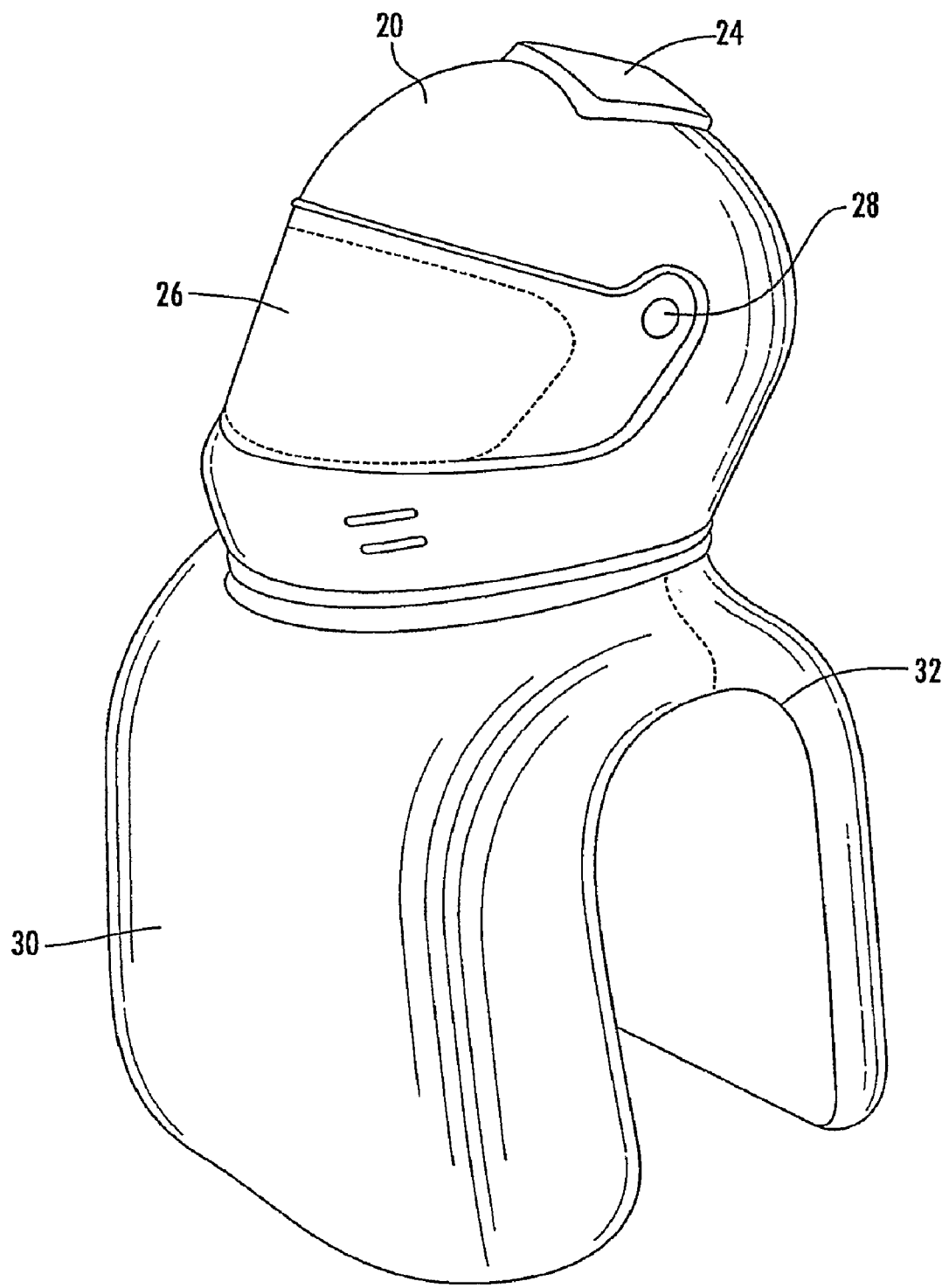

FIGS. 7a and 7b illustrate still another embodiment and show a helmet 20 with an inflatable restraining member that stores as a collar 22. An activation module 24 comprises a system of sensors that detect collisions, impacts or large accelerations of a predetermined value, which may be dangerous to the wearer. When this activation module 24 receives a "deploy" signal from the impact or acceleration sensors that are mounted on the vehicle, or on the user, it can activate the rapid inflation of the collar 22. The collar may deploy like a vest 30 as shown in FIG. 7, extending down the wearer's chest and back to provide resistance to accelerations of the head relative to the body—especially rotationally. The vest may include arm cutouts 32. The collar is similar to airbags used in automobiles. The collar 22 may also expand to a smaller size than vest 30. When the user wears this helmet, there may be little or no contact between the collar and the wearer, providing unencumbered motion and range. The activation module 24 can be located on and/or in the helmet, and houses the electronics needed for activating the inflation of the airbag collar or activating some other form of anti-rotational means. Sensors, accelerometers and complete airbag deployment systems may be employed and are common and well known in the art. Examples of these systems and their "sensing module" equivalents can be found in U.S. Pat. Nos. 5,338,062 and 7,165,785, which patents are incorporated herein by reference.

A conventional helmet may also include a see through visor 26, which can pivot at joint 28.

Another embodiment of this invention utilizes a collar 50 (FIG. 8) that is connected to the helmet and extends to reference plate 120', which may be affixed to the torso, shoulders, seat or other component. When activation module 24' receives a "deploy" signal from the impact or acceleration sensors, it will stiffen the collar to dampen acceleration and limit the total travel of the head. This collar may be similar to an airbag, and is stiffened by rapid inflation.

Figure 8:
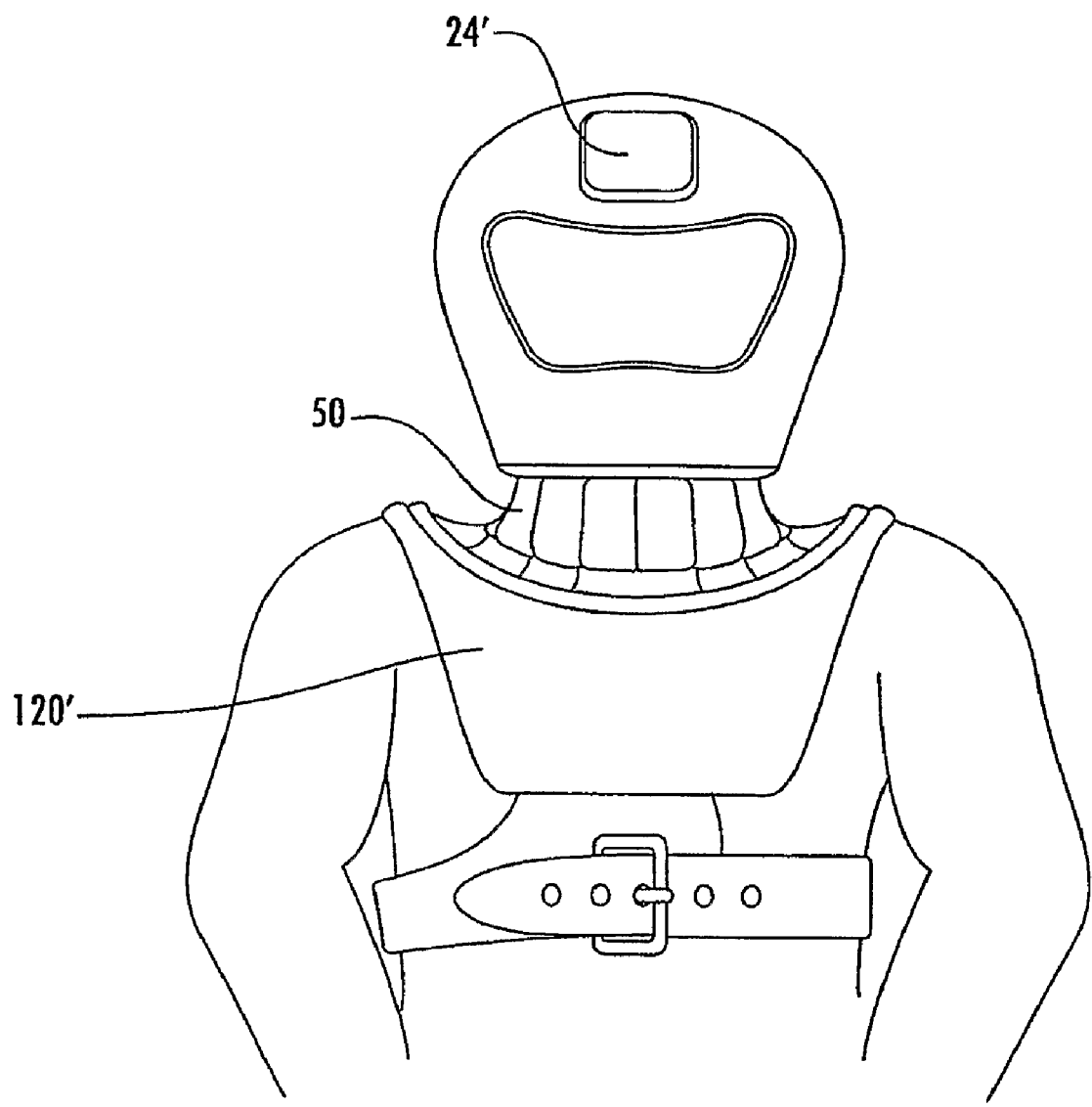
FIG. 8 is a front view of another embodiment of this invention.

Another embodiment utilizes a collar similar to that shown as 50 in FIG. 8 between the helmet and shoulders that is easily flexed and rotated, except during large and dangerous accelerations when it behaves like a much stiffer material—resistant to fast deflection. This material may be a Silicone and/or a foam or fluid.

The tethers shown in the various embodiments are built into a spool and function similar to an ABS disk brake to achieve significant damping rather than sudden stopping. Additionally, the tether could comprise a sacrificial tether material for one time use to be combined with a locking spool. Additionally, the tether material could be formed of the material so described in FIG. 8 which stiffens upon sensing high acceleration.

The sensor used, as described above, may comprise multi-axis accelerometers, rotational accelerometers, contact sensors, and/or position sensors, which measure the movement of the spools.

The placement of the sensors may comprise a coordinated array of sensors which can be located on the vehicle, torso harness and/or helmet to provide early detection of impact independent of where the impact occurs.

Figure 9A:
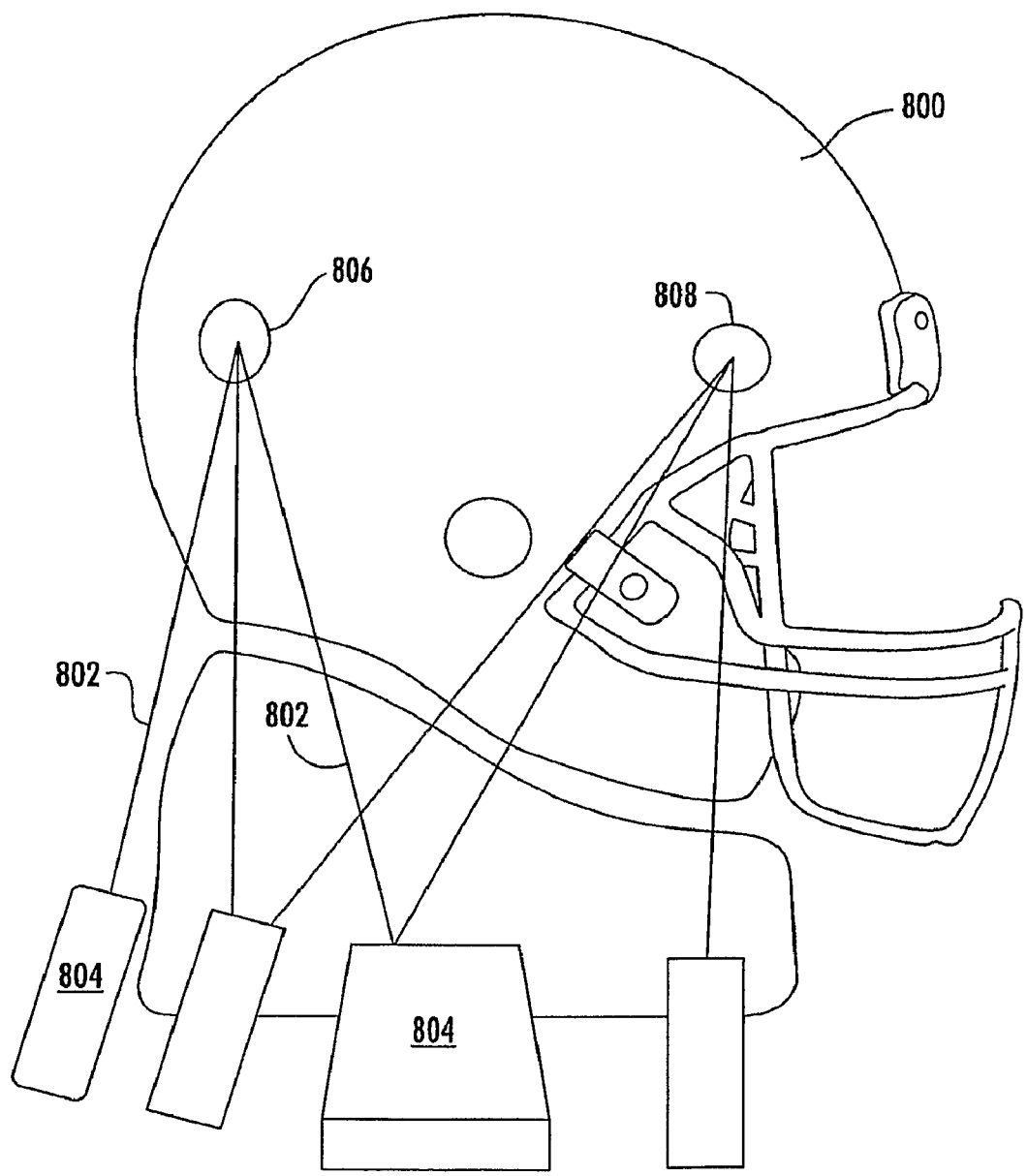
FIGS. 9a and 9b are side views of another embodiment of this invention utilizing football helmet type apparatus.
Figure 9B:
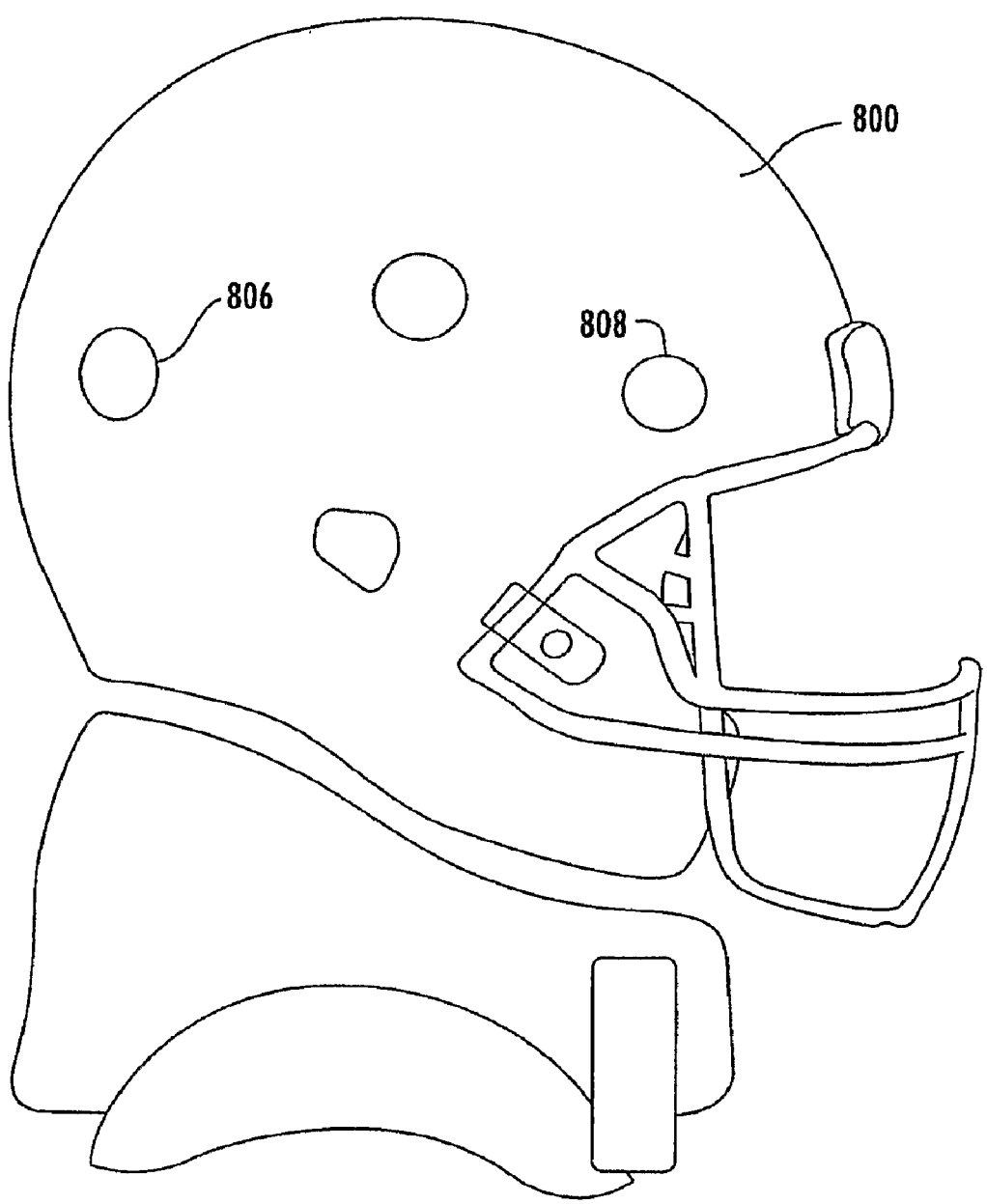

FIGS. 9*a* and 9*b* illustrate this invention used with football like helmets 800 which illustratively show a plurality of tethers 802 attached to a plurality of respective spools 804 and also being attached at various points 806 and 808 on the helmet.

It is understood that the various mechanisms to control rotational movement of the head can be "switched" off or physically removed so that the head and torso are free from any possible restraint.

It should be understood that the preferred embodiment was described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly legally and equitably entitled.

The invention claimed is:

1. A device to restrict rotational acceleration of the head of a person, said device comprising:
a helmet adapted to secure to the head of a user, the helmet including a plurality of attachment points for engaging a first end of a plurality of tethers; and
a reference plate adapted to secure to the neck of the user, the reference plate including a plurality of spools for engaging a second end of the tethers and on which the tethers are wound,
wherein the tethers are configured to detect head rotation in the sagittal plane, the coronal plane and the axial plane, and
wherein the spools are configured to restrain rotational acceleration of the head of the user relative to the reference plate in response to rotation of the head.

2. A device according to claim 1, wherein said reference plate comprises a flexible material which drapes on the shoulders and torso of the user.

3. A device according to claim 1, wherein said helmet resembles a football helmet.

4. A device according to claim 1, wherein said spools lock the tethers against any movement to substantially stop rotational movement of the head.

5. A device according to claim 1, wherein the reference plate is a collar plate adapted to engage the base of the neck of the user.

6. A device according to claim 1, further comprising a body harness having a chest strap and a vertical connecting strap engaging the reference plate, the body harness substantially fixing the reference plate with respect to the torso of the user.

7. A device according to claim 1, wherein the reference plate is a shoulder plate covering a portion of the back of the user, the shoulders of the user, and the chest of the user.

8. A device according to claim 7, wherein the shoulder plate is adjustable.

9. A device according to claim 1, wherein the spools are mechanically controlled.

10. A device according to claim 1, wherein the spools are electro-mechanically controlled.

11. A device according to claim 1, wherein the spools are configured to slow, dampen and stop the movement of the head of the user relative to the reference plate.

12. A device according to claim 1, wherein the spools include a pretensioning system adapted to eliminate slack in the tethers.

13. A device to restrict rotational acceleration of the head of a person, the device comprising:
a helmet adapted to secure to the head of a user, the helmet including a right front attachment point, a right rear attachment point, a left front attachment point, a left rear attachment point, and a rear attachment point, the attachment points for engaging a first end of a plurality of tethers; and
a reference plate adapted to engage the neck of the user, the reference plate including a right front spool, a right middle spool, a right rear spool, a left front spool, a left middle spool, a left rear spool, and a rear spool, the spools for engaging a second end of the tethers and on which the tethers are wound,
wherein the tethers are configured to detect head rotation in the sagittal plane, the coronal plane and the axial plane, and
wherein the spools are configured to restrain rotational acceleration of the head of the user relative to the reference plate in response to rotation of the head.

14. A device according to claim 13, wherein the reference plate comprises a flexible material which engages on the shoulders and torso of the user.

15. A device according to claim 13, wherein the helmet resembles a football helmet.

16. A device according to claim 13, wherein the spools lock the tethers against any movement to substantially stop rotational movement of the head.

17. A device according to claim 13, wherein the reference plate is a collar plate adapted to engage the base of the neck of the user.

18. A device according to claim 13, further comprising a body harness having a chest strap and a vertical connecting strap engaging the reference plate, the body harness substantially fixing the reference plate with respect to the torso of the user.

19. A device according to claim 13, wherein the reference plate is a shoulder plate covering a portion of the back of the user, the shoulders of the user, and the chest of the user.

20. A device according to claim 19, wherein the shoulder plate is adjustable.

21. A device according to claim 13, wherein the spools are mechanically controlled.

22. A device according to claim 13, wherein the spools are electro-mechanically controlled.

23. A device according to claim 13, wherein the spools are configured to slow, dampen and stop the movement of the head of the user relative to the reference plate.

24. A device according to claim 13, wherein the spools include a pretensioning system adapted to eliminate slack in the tethers.

25. A device to restrict rotational acceleration of the head of a person, the device comprising:
- a helmet adapted to secure to the head of a user, the helmet including a right chin attachment point, a right crown attachment point, a left chin attachment point, a left crown attachment point, a front attachment point, and a back attachment point, the attachment points for engaging a first end of a plurality of tethers; and
- a reference plate adapted to secure to the shoulder, chest, and back of the user, the reference plate including a right front spool, a right back spool, a left front spool, a left back spool, a chest spool, and a back spool, the spools for engaging a second end of the tethers and on which the tethers are wound,
- wherein the tethers are configured to detect head rotation in the sagittal plane, the coronal plane and the axial plane, and
- wherein the spools are configured to restrain rotational acceleration of the head of the user relative to the reference plate in response to rotation of the head.

26. A device according to claim 25, wherein the spools are configured to slow, dampen and stop the movement of the head of the user relative to the reference plate.

* * * * *